(12) United States Patent
Matsushita et al.

(10) Patent No.: US 10,038,229 B2
(45) Date of Patent: Jul. 31, 2018

(54) BATTERY

(71) Applicant: TOYOTA JIDOSHA KABUSHIKI KAISHA, Toyota-shi, Aichi-ken (JP)

(72) Inventors: Yuki Matsushita, Atsugi (JP); Mitsuru Tateishi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 15/331,352

(22) Filed: Oct. 21, 2016

(65) Prior Publication Data

US 2017/0117598 A1 Apr. 27, 2017

(30) Foreign Application Priority Data

Oct. 22, 2015 (JP) ................................. 2015-208405

(51) Int. Cl.
| | |
|---|---|
| *H01M 10/653* | (2014.01) |
| *H01M 10/659* | (2014.01) |
| *H01M 10/0585* | (2010.01) |
| *H01M 4/66* | (2006.01) |
| *H01M 10/6595* | (2014.01) |
| *H01M 10/613* | (2014.01) |

(52) U.S. Cl.
CPC ......... *H01M 10/653* (2015.04); *H01M 4/667* (2013.01); *H01M 10/0585* (2013.01); *H01M 10/613* (2015.04); *H01M 10/659* (2015.04); *H01M 10/6595* (2015.04)

(58) Field of Classification Search
CPC ............. H01M 10/653; H01M 10/659; H01M 10/0585; H01M 10/6595; H01M 10/613; H01M 4/667
See application file for complete search history.

(56) References Cited

U.S. PATENT DOCUMENTS

| | | | |
|---|---|---|---|
| 9,825,345 B2 * | 11/2017 | Liu | H01M 10/6569 |
| 2011/0159341 A1 * | 6/2011 | Iwamoto | H01M 2/1094 |
| | | | 429/120 |
| 2013/0157089 A1 * | 6/2013 | Miyatake | H05K 7/20509 |
| | | | 429/72 |
| 2016/0156213 A1 | 6/2016 | Yajima et al. | |
| 2016/0223269 A1 * | 8/2016 | Hartmann | C09K 5/063 |

FOREIGN PATENT DOCUMENTS

| | | |
|---|---|---|
| JP | 2009-266402 A | 11/2009 |
| JP | 2010-053196 A | 3/2010 |
| JP | 2010-73539 A | 4/2010 |
| JP | 2012-48905 A | 3/2012 |
| JP | 5536638 B2 | 7/2014 |
| JP | 2015-29036 A | 2/2015 |
| JP | 2015-069848 A | 4/2015 |
| WO | 2012-029270 A1 | 3/2012 |

* cited by examiner

*Primary Examiner* — Jane Rhee
(74) *Attorney, Agent, or Firm* — Oliff PLC

(57) ABSTRACT

A battery including a heat absorbing layer that has a large endotherm per unit volume. The battery comprises at least one heat absorbing layer, the at least one heat absorbing layer comprising an inorganic hydrate and at least one organic heat absorbing material selected from the group consisting of a sugar alcohol and a hydrocarbon.

13 Claims, 17 Drawing Sheets

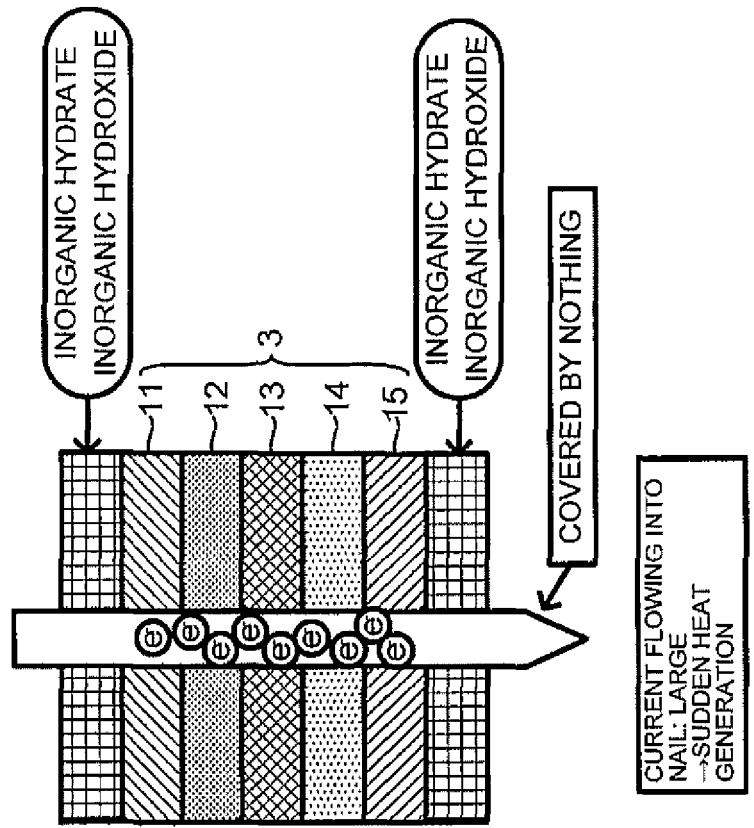
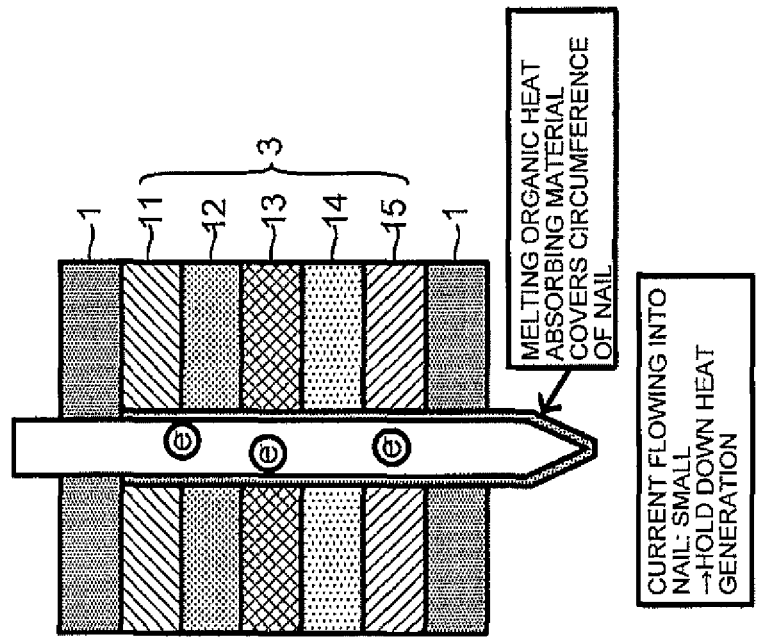

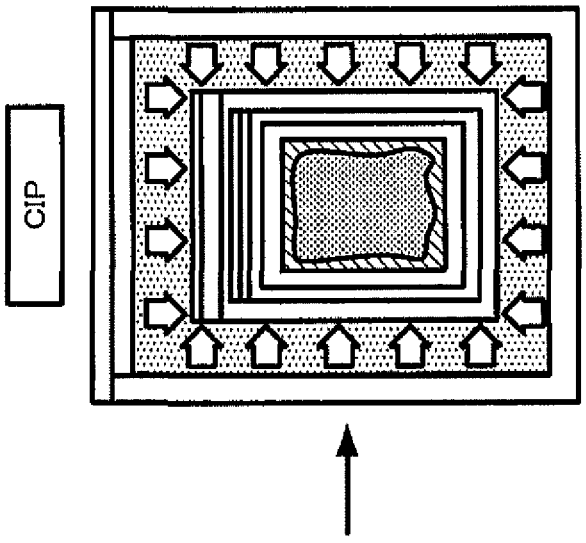
FIG. 6A
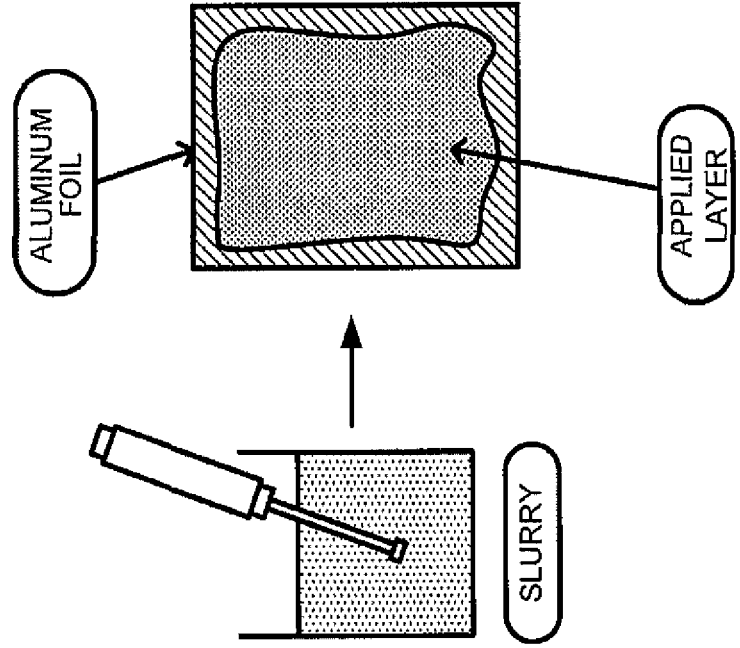
FIG. 6B
FIG. 6C
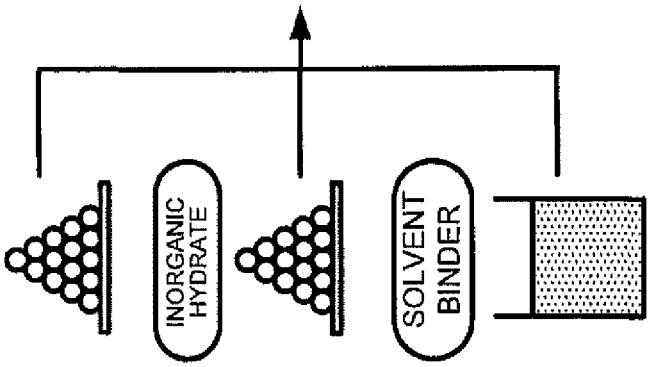
FIG. 6D

BATTERY

This application claims priority to Japanese Application No. 2015-208405, filed Oct. 22, 2015. The entire contents of the prior application are hereby incorporated by reference herein in their entirety.

FIELD

This application relates to batteries including heat absorbing layers.

BACKGROUND

Batteries sometimes generate heat suddenly due to short circuits and so on. In this case, arrangement of a heat absorbing layer in part of a battery allows heat to be absorbed properly. Inorganic hydrates such as calcium sulfate dihydrate, and inorganic hydroxides such as aluminum hydroxide are known as materials constituting heat absorbing layers for batteries (Patent Literatures 1 and 2). Inorganic hydrates and inorganic hydroxides have large theoretical endotherm and are preferable for materials constituting heat absorbing layers for batteries.

CITATION LIST

Patent Literature

Patent Literature 1: JP 2009-266402A
Patent Literature 2: JP 2010-053196A

SUMMARY

Technical Problem

Inorganic hydrates and inorganic hydroxides have high hardness. It was found that when such a material of high hardness constitutes a heat absorbing layer, voids are generated in the heat absorbing layer, which make the compactness deteriorate, and an endotherm of the heat absorbing layer per unit volume is largely reduced.

An object of the disclosed embodiments is to provide a battery including a heat absorbing layer that has a large endotherm per unit volume.

Solution to Problem

In a first embodiment, there is provided a battery comprising at least one heat absorbing layer, the at least one heat absorbing layer comprising an inorganic hydrate and at least one organic heat absorbing material selected from the group consisting of a sugar alcohol and a hydrocarbon.

The inorganic hydrate may lose at least part of water of hydration at any temperature in the range of 60° C. to 250° C., and a melting point of the at least one organic heat absorbing material may be in the range of 60° C. to 250° C.

The at least one organic heat absorbing material may be the sugar alcohol, and the sugar alcohol may be mannitol. An endotherm of the mannitol may be in the range of 90° C. to 200° C. The inorganic hydrate may be calcium sulfate dihydrate.

An amount of the at least one organic heat absorbing material in the at least one heat absorbing layer may be no less than 50%, by mass %, of a total amount of the at least one organic heat absorbing material and the inorganic hydrate. An amount of the at least one organic heat absorbing material in the at least one heat absorbing layer is no less than 10 mg/cm$^2$.

The battery may further comprise a battery case configured to include the at least one heat absorbing layer and at least one unit cell inside the battery case.

The at least one unit cell may be an all-solid-state battery, and the at least one heat absorbing layer and the at least one unit cell may be in contact with each other.

The all-solid-state battery may include a cathode collector, a cathode layer, a solid electrolyte layer, an anode layer and an anode collector in sequential order in a thickness direction of the battery, and the at least one heat absorbing layer may be provided on at least one of a surface of the cathode collector disposed on a side opposite to the cathode layer and a surface of the anode collector disposed on a side opposite to the anode layer.

A plurality of heat absorbing layers and unit cells are included inside the battery case, and each of the heat absorbing layers is interposed between respective unit cells.

The at least one heat absorbing layer may further comprise a binder.

The at least one heat absorbing layer may have a sheet shape. A thickness of the at least one heat absorbing layer may be in the range of 5 μm to 500 μm. A compactness of the at least one heat absorbing layer may be no less than 80%. A compactness of the at least one heat absorbing layer may be no less than 90%.

BRIEF DESCRIPTION OF DRAWINGS

FIGS. 3A and 3B are schematic views of a shutdown effect according to an embodiment;

FIGS. 6A, 6B, 6C and 6D are schematic views of a procedure for making a heat absorbing sheet according to an embodiment;

DETAILED DESCRIPTION OF EMBODIMENTS

Figure 1A:
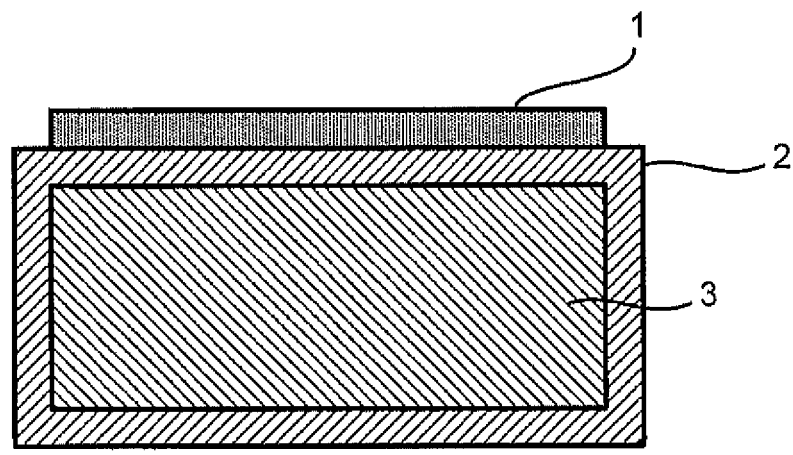
FIGS. 1A and 1B are schematic views of a heat absorbing layer is disposed in a battery according to an embodiment (terminals and the like are omitted for simplification)

In the disclosed embodiments, a battery including a heat absorbing layer that has a large endotherm per unit volume is provided.

The disclosed embodiments employ the following structures in order to achieve the above object. There is provided a battery comprising: a heat absorbing layer, wherein the heat absorbing layer includes an inorganic hydrate and at least one kind of an organic heat absorbing material selected from sugar alcohols and hydrocarbons.

The heat absorbing layer in the disclosed embodiments refers to a layer that absorbs the generated heat by means of endothermic reaction when the battery generates heat extraordinarily due to a short circuit or the like.

The battery may have any suitable structure in so far as the heat generated by the battery can be absorbed by the heat absorbing layer. The heat absorbing layer may be arranged in any suitable manner in the battery. The heat absorbing layer can be disposed on any suitable place in the battery such as, for example, an exterior wall of a battery case and the inside of the battery case (in addition to a surface of an interior wall of the battery case, a surface of some member housed inside the battery case and a surface of a unit cell housed inside the battery case). However, it is preferable to include the heat absorbing layer inside the battery case as described later.

The inorganic hydrate in the disclosed embodiments releases water of hydration to absorb the heat when the battery generates heat extraordinarily.

The at least one kind of an organic heat absorbing material selected from sugar alcohols and hydrocarbons in the disclosed embodiments melts to absorb the heat when the battery generates heat extraordinarily.

The heat absorbing layer is a solid layer that keeps a certain shape when the battery is in an ordinary state (in a state before the battery generates heat extraordinarily due to a short circuit or the like; for example, at normal temperature). Both the inorganic hydrate and at least one kind of an organic heat absorbing material selected from sugar alcohols and hydrocarbons exist as solids when the battery is in an ordinary state.

As a result of progressive intensive research on heat absorbing layers included in batteries, it was found that:

(1) Inorganic hydrates and inorganic hydroxides have large theoretical endotherm. However, they have high hardness, and when used for a heat absorbing layer, voids are generated, which make the compactness deteriorate, and an endotherm of the heat absorbing layer per unit volume largely decreases compared to the theoretical endotherm;

(2) In a case where a material of low hardness is mixed into a heat absorbing layer, the material undergoes plastic deformation when formed, which makes it possible to improve the compactness of the heat absorbing layer;

(3) Sugar alcohols and hydrocarbons are preferable for a material of low hardness, which is mixed into a heat absorbing layer. This is because they themselves display an endothermic performance. That is, hydrocarbons and sugar alcohols are not only materials of low hardness but are able to melt to absorb the heat when a battery generates heat extraordinarily. Especially, sugar alcohols are preferable;

(4) The endotherm of inorganic hydroxides, among inorganic hydrates and inorganic hydroxides, sometimes also reduces due to the reaction with sugar alcohols. That is, the combination of at the at least one kind selected from sugar alcohols and hydrocarbons and inorganic hydrate has the highest effect as a combination of heat absorbing materials that constitute a heat absorbing layer;

(5) In a case where a sugar alcohol and/or a hydrocarbon and an inorganic hydrate constitute a heat absorbing layer, an endotherm of the heat absorbing layer per unit volume largely and surprisingly increases compared with a case where only a sugar alcohol and/or a hydrocarbon constitute(s) the heat absorbing layer and the case where only an inorganic hydrate constitutes the heat absorbing layer. That is, the above described combination displays an unexpected combined effect; and (6) Increasing the proportion of a sugar alcohol and/or a hydrocarbon included in a heat absorbing layer allows a melting sugar alcohol and/or a hydrocarbon to adhere to the circumference of a nail in a nail penetration test, for example. In this case, an amount of current flowing into the nail in nail penetration can be reduced, and as a result, an effect of holding down extraordinary heat generation of a battery can be obtained (hereinafter, this effect may be referred to as "shutdown effect"). Such an effect cannot be obtained from inorganic hydrates or inorganic hydroxides, which vaporize to absorb heat.

The disclosed embodiments were made based on the above knowledge. In embodiments, the battery comprises a heat absorbing layer, wherein the heat absorbing layer includes an inorganic hydrate and at least one kind of an organic heat absorbing material selected from sugar alcohols and hydrocarbons.

1. Heat Absorbing Layer

The battery according to disclosed embodiments includes a heat absorbing layer therein. The heat absorbing layer includes an inorganic hydrate and at least one kind of an organic heat absorbing material selected from sugar alcohols and hydrocarbons. In view of improving the plasticity, it is preferable that the heat absorbing layer further include binder.

1.1. Organic Heat Absorbing Material

In the disclosed embodiments, the heat absorbing layer includes at least one kind of an organic heat absorbing material selected from sugar alcohols and hydrocarbons. While existing as a solid when the battery is in an ordinary state, this organic heat absorbing material melts to absorb the heat when the battery generates heat extraordinarily.

It was found that both sugar alcohols and hydrocarbons are: (I) materials that melt to absorb heat; (II) softer than inorganic hydrates and able to undergo plastic deformation when formed; and (III) difficult to react with inorganic hydrates. Therefore, in a case where any of a sugar alcohol and a hydrocarbon is included in the heat absorbing layer, compactness of the heat absorbing layer can be properly increased, and an endotherm of the heat absorbing layer per unit volume can be increased largely by the above described combined effect with an inorganic hydrate. Preferably, one of a sugar alcohol and a hydrocarbon, which has a higher endothermic temperature (melting temperature) and a larger endotherm per unit volume is selected. Sugar alcohols were found to be preferable to hydrocarbons.

In view of allowing the heat to be absorbed more properly when the battery generates heat extraordinarily, it is preferable that the organic heat absorbing material have its endothermic onset temperature and endothermic peak temperature within the range of 60° C. to 250° C. It is also preferable that an endothermic reaction of the organic heat absorbing material is completed within the range of 60° C. to 250° C. as to a DSC curve obtained from differential scanning calorimetry (under an argon atmosphere, the heating rate: 10° C./min). Hydrocarbons like the above include, but are not limited to, hectane and anthracene. On the other hand, examples of sugar alcohols include, but are not limited to, mannitol, xylitol, erythritol, lactitol, maltitol, sorbitol and galactitol. The most preferable sugar alcohol is mannitol. It was found that an endotherm of mannitol within the range of 90° C. to 200° C. was larger than the other sugar alcohols. In addition, using mannitol makes it possible to match a temperature of the heat generated when the battery extraordinarily generates heat to an endothermic temperature of the heat absorbing layer.

1.2. Inorganic Hydrate

In the disclosed embodiments, the heat absorbing layer includes an inorganic hydrate. While existing as a solid when the battery is in an ordinary state, the inorganic hydrate releases water of hydration to absorb heat when the battery generates heat extraordinarily.

In view of allowing the heat to be absorbed more properly when the battery generates heat extraordinarily, it is preferable that the inorganic hydrate loses at least part of water of hydration at any temperature in the range of 60° C. to 250° C. It is also preferable that an endothermic reaction of the inorganic hydrate is completed within the range of 60° C. to 250° C. as to a DSC curve obtained from differential scanning calorimetry (under an argon atmosphere, the heating rate: 10° C./min.). Specific examples of such an inorganic hydrate include, but are not limited to, calcium sulfate dihydrate, copper(II) sulfate pentahydrate, lithium sulfate monohydrate, magnesium chloride dihydrate and zirconium (IV) sulfate tetrahydrate. The most preferable inorganic hydrate is calcium sulfate dihydrate. An endotherm of calcium sulfate dihydrate within the range of 60° C. to 200° C. is large. In addition, using calcium sulfate dihydrate makes it possible to match a temperature of the heat generated when the battery extraordinarily generates heat to an endothermic temperature of the heat absorbing layer.

1.3. Binder

In the disclosed embodiments, binder may be included in the heat absorbing layer. The binder binds the above described organic heat absorbing material with the inorganic hydrate. The binder may be any suitable binder as long as it undergoes no chemical reaction with the organic heat absorbing material and the inorganic hydrate. Any kind of binder such as, for example, butadiene rubber (BR), acrylate-butadiene rubber (ABR) and polyvinylidene difluoride (PVdF) can be used.

The heat absorbing layer may include constituents other than the above described organic heat absorbing material, inorganic hydrate and binder as long as the beneficial effect of the disclosed embodiments is not impaired.

1.4. Each Content of Constituents in Heat Absorbing Layer

Preferably, the above described organic heat absorbing material is 5 mass %/o to 95 mass % of the heat absorbing layer, and the above described inorganic hydrate is 5 mass % to 95 mass % of the heat absorbing layer. It is also preferable that the total of the organic heat absorbing material and the inorganic hydrate be no less than 98 mass % of the heat absorbing layer. On the other hand, in a case where the heat absorbing layer includes the binder, the content of the binder is preferably no more than 2 mass %.

It was found with intensive research that in a case where much more of the above described organic heat absorbing material is included in the heat absorbing layer than the inorganic hydrate on a mass basis, the heat absorbing layer displays a predetermined effect of compatibility. As such, it is most preferable that the heat absorbing layer include no less than 50 mass % of the organic heat absorbing material on the basis of the total of the organic heat absorbing material and the inorganic hydrate (100 mass %), or the organic heat absorbing material is no less than 10 mg/cm$^2$ of the heat absorbing layer. Whereby, compactness of the heat absorbing layer increases to 90% or more, and the heat absorbing layer displays the shutdown effect.

1.5. Shape of Heat Absorbing Layer

A shape of the heat absorbing layer may be properly determined according to a shape of the battery. A shape of the heat absorbing layer is preferably like a sheet. In this case, the heat absorbing layer is preferably 5 μm to 500 μm in thickness. The lower limit is more preferably no less than 0.1 μm and the upper limit is more preferably no more than 1000 μm. The sheet-like heat absorbing layer makes it possible to reduce the volume ratio of the heat absorbing layer to the battery. The heat absorbing layer according to one embodiment of the disclosed embodiments includes the above described organic heat absorbing material, which is able to undergo plastic deformation, and thus is superior to heat absorbing layers composed of inorganic hydrates in plasticity and flexibility. In short, even if the heat absorbing layer is thinned, it is difficult to crack.

The compactness of the heat absorbing layer is preferably no less than 80%. More preferably, its compactness is no less than 85%. In the disclosed embodiments, such high compactness can be achieved by the heat absorbing layer including the above described organic heat absorbing material. High compactness makes it possible to increase endotherm per unit volume. In addition, heat from the battery can be quickly propagated in the heat absorbing layer, and thus, the effect of quickly absorbing the heat when the battery generates heat extraordinarily can be brought about. Compactness of the heat absorbing layer is calculated as follows: first, a weight and a volume of the heat absorbing layer are measured, to calculate the density. The calculated density is divided by the true density, and then the compactness can be calculated.

1.6. Method for Forming and Making Heat Absorbing Layer

In the disclosed embodiments, the above described organic heat absorbing material, inorganic hydrate and optionally binder are mixed to form any shape, to be able to make the heat absorbing layer. Both dry shaping and wet shaping may be applied. For example, in a case of wet shaping, the above described constituents are added to a solvent to be slurry. This slurry is applied on a base material to be dried, and appropriately pressed. Whereby, the sheet-like heat absorbing layer as described above can be obtained. For example, heptane, ethanol, N-methylpyrrolidone, butyl acetate and butyl butyrate can be used as the solvent.

2. Structure of Battery Other than Heat Absorbing Layer

The battery according to an embodiment can have the same structure as a conventional battery except that it includes the above described heat absorbing layer. The battery usually houses at least one unit cell inside a battery case.

2.1. Battery Case

A material and shape of the battery case are not especially limited as long as the battery case can house a unit cell. For example, the battery case can be composed of a housing made of metal, a laminate film made by layering metal foil and a resin film, and so on. It is possible that a plurality of the battery cases each containing a unit cell are prepared, and they are further contained in a battery case, to make a battery pack.

2.2. Unit Cell

In the disclosed embodiments, the unit cell housed inside the battery case may be either an all-solid-state battery or an electrolyte battery. Especially, an all-solid-state battery is preferable. In a case of an electrolyte battery, there is a risk that an electrolyte and the heat absorbing layer react with each other. Thus, it is necessary to provide a separate layer or the like between the electrolyte battery and the heat absorbing layer in order to prevent the electrolyte and the heat absorbing layer from being in contact with each other. On the other hand, this is not necessary in the case of an all-solid-state battery. As described later, the heat absorbing layer can be arranged so as to be in contact with the all-solid-state battery. The all-solid-state battery itself may have the same structure as a conventional all-solid-state battery. For example, the all-solid-state battery includes a cathode collector, a cathode layer, a solid electrolyte layer, an anode layer and an anode collector provided therewith in this order.

Hereinafter a lithium all-solid-state battery exemplified as the unit cell and will be explained. In the disclosed embodiments, a battery applicable to the unit cell is not limited to a lithium battery, and may be a sodium battery, or may be another metal ion battery. The unit cell may be a primary battery, and may be a secondary battery. It is noted that extraordinary heat generation from the battery tends to occur when the battery is used for a long time while charged and discharged repeatedly. That is, a secondary battery is preferred to a primary battery in view of making the effect of the disclosed embodiments more pronounced.

2.2.1. Cathode Layer and Anode Layer

Each of the cathode layer and the anode layer at least includes an active material, and optionally, further includes solid electrolyte, binder and a conductive additive. A known active material may be used as the active material. Among known active materials, two materials different in electric potential at which lithium ions are stored and released (charge and discharge potential) are selected, and a material displaying noble potential can be used as a cathode active material and a material displaying base potential can be used as an anode active material. For example, $LiNi_{1/3}Co_{1/3}Mn_{1/3}O_2$ can be used as the cathode active material and graphite can be used as the anode active material. The solid electrolyte is preferably inorganic solid electrolyte. This is because ion conductivity of inorganic solid electrolyte is high compared with organic polymer electrolyte. Also, this is because inorganic solid electrolyte is superior compared with organic polymer electrolyte in heat resistance. Examples of an inorganic solid electrolyte include solid oxide electrolyte such as $Li_3PO_4$ and sulfide solid electrolyte such as $Li_2S$—$P_2S_5$. Especially, sulfide solid electrolyte including $Li_2S$—$P_2S_5$ is preferable. As the binder, a binder the same as that used in the heat absorbing layer can be used. A carbon material such as acetylene black and ketjenblack, a metallic material such as nickel, aluminum and stainless steel can be used as the conductive additive. The content of the constituents in the cathode layer and the anode layer, and each shape of the cathode layer and the anode layer may be similar to conventional cathode layers and the anode layers.

2.2.2. Cathode Collector and Anode Collector

As described below, in the disclosed embodiments, the heat absorbing layer can be provided on each surface of any of the cathode collector and the anode collector (surfaces on the side opposite to the cathode layer and the anode layer). The cathode collector and the anode collector may be composed of metal foil, metal mesh or the like. Especially, metal foil is preferable. In the case where metal foil is used as the collectors, the heat absorbing layer is not directly in contact with the cathode layer and/or the anode layer even if the heat absorbing layer is arranged on the surface of any collector, and the heat absorbing layer and battery materials do not react with each other. For example, Cu, Ni, Al, Fe, Ti and so on can be used as the metal constituting the cathode collector and the anode collector.

2.2.3. Solid Electrolyte Layer

The solid electrolyte layer includes solid electrolyte and optionally binder. The solid electrolyte is preferably inorganic solid electrolyte as described above. As the binder, binder the same as that used in the heat absorbing layer can be used.

3. Place where Heat Absorbing Layer is Disposed

Figure 1B:
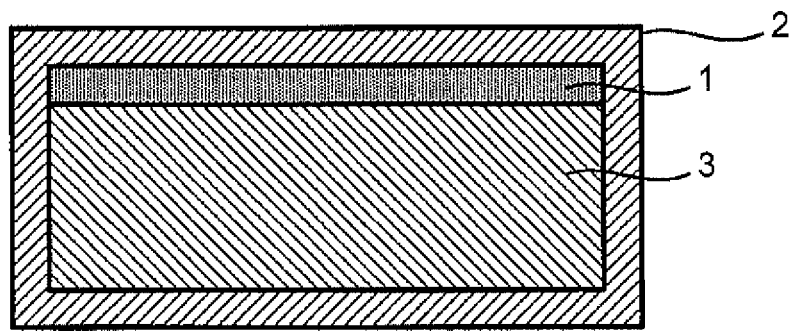

In the battery according to the disclosed embodiments, a place where the heat absorbing layer is disposed is not especially limited as long as the heat is properly absorbed when the battery generates heat extraordinarily. For example, as depicted in FIGS. 1A and 1B, in the battery including a unit cell 3 inside a battery case 2, a heat absorbing layer 1 may be disposed on an exterior wall of the battery case 2 (FIG. 1A), or may be disposed inside the battery case 2 (FIG. 1B). Especially, such a configuration is preferable that the heat absorbing layer 1 and at least one unit cell 3 be included inside the battery case 2. This is because including the heat absorbing layer 1 in the vicinity of the unit cell 3, which is a heat generation source, allows the heat absorbing layer 1 to absorb the heat efficiently when the battery generates heat extraordinarily.

Figure 2A:
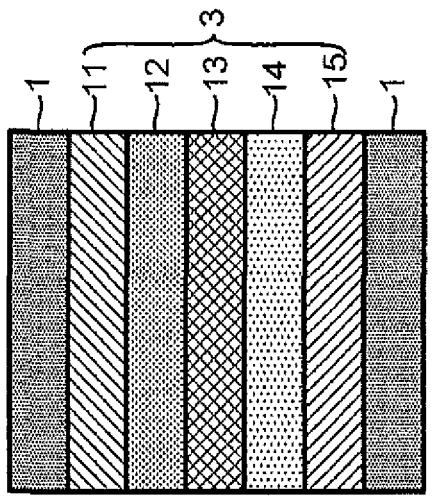
FIGS. 2A, 2B and 2C are schematic views of the heat absorbing layer disposed on a unit cell according to an embodiment.
Figure 2B:
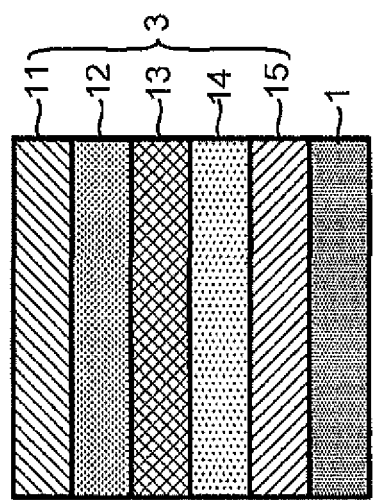
Figure 2C:
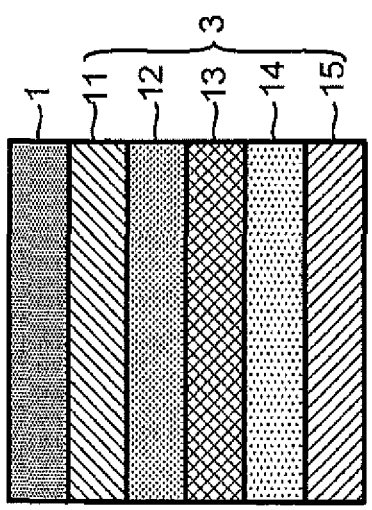

In the case where the heat absorbing layer 1 is disposed inside the battery case 2, it is preferable that the unit cell 3 be an all-solid-state battery and the heat absorbing layer 1 and the unit cell 3 are in contact with each other. Especially, as depicted in FIGS. 2A, 2B and 2C, it is preferable that in the all-solid unit cell 3 including a cathode collector 11, a cathode layer 12, a solid electrolyte layer 13, an anode layer 14 and an anode collector 15 provided therewith in this order, the heat absorbing layer 1 be provided on at least one surface of a surface of the cathode collector 11 in the side opposite to the cathode layer 12 and a surface of the anode collector 15 in the side opposite to the anode layer 14. Whereby, heat absorbing layer 1 can absorb the heat more efficiently when the battery generates heat extraordinarily. As depicted in FIG. 3A, a melting organic heat absorbing material is adhered to the circumference of a nail in a nail penetration test of the unit cell 3, and the above described "shutdown effect" can be obtained. Such an effect is a unique effect brought about by the heat absorbing layer 1 including the above described organic heat absorbing material, and cannot be obtained from a heat absorbing layer composed of an inorganic hydrate or an inorganic hydroxide (FIG. 3B). In addition, the possibility that the heat absorbing layer 1 and any battery materials react with each other can be ruled out since the heat absorbing layer 1 is not in contact with any active material and solid electrolyte.

Figure 4:
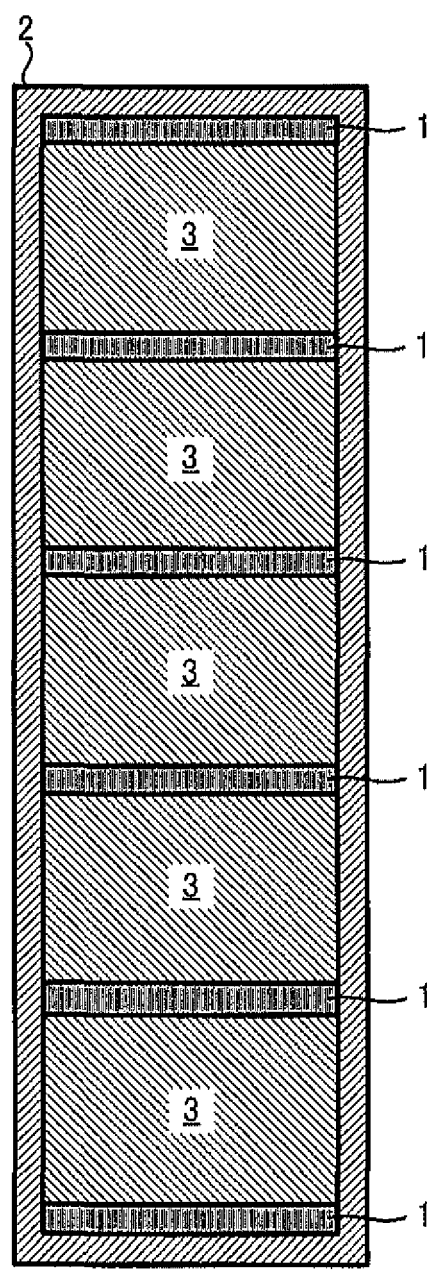
FIG. 4 is a schematic view of the heat absorbing layers disposed in a battery according to an embodiment (a part of members are omitted for simplification)
Figure 5:
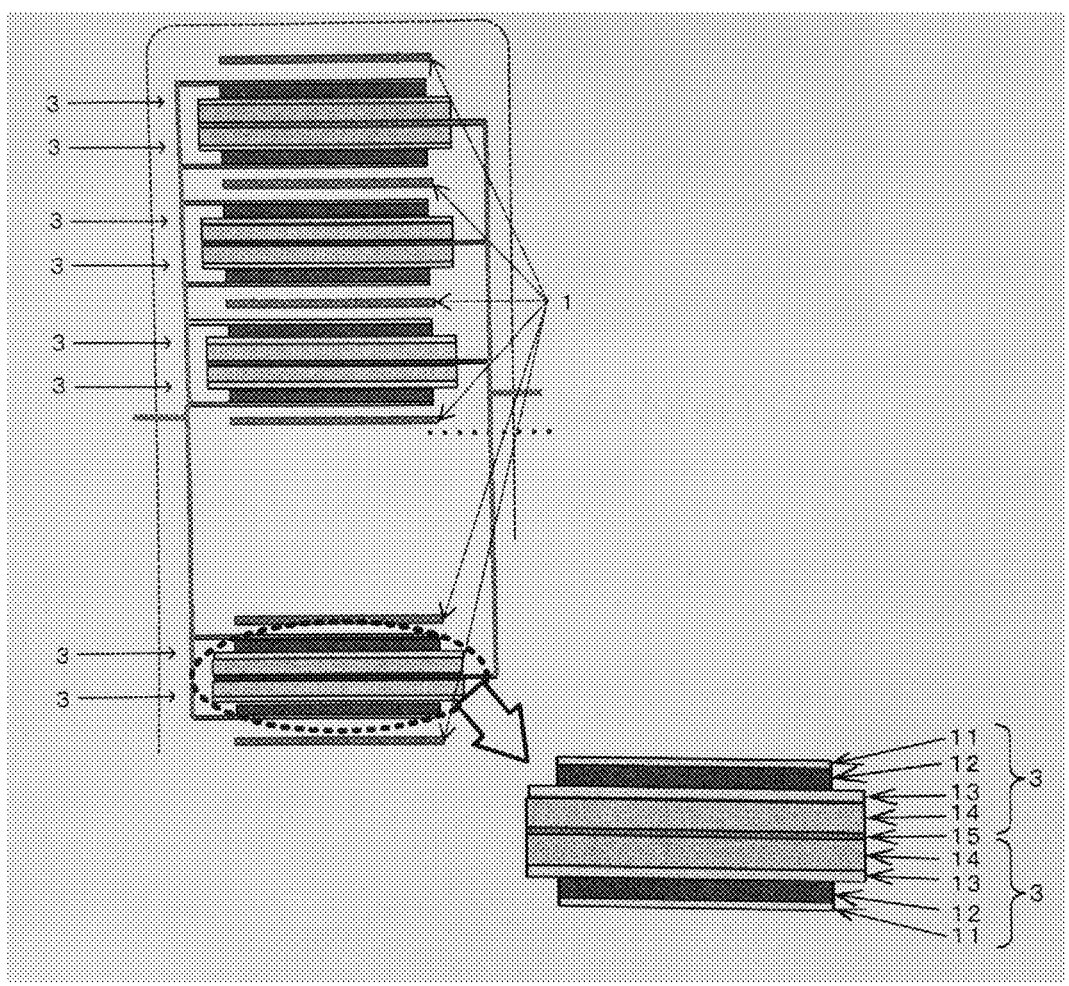
FIG. 5 is a schematic view of the heat absorbing layers disposed in a battery according to an embodiment (a part of members are omitted for simplification)

A plurality of the unit cells 3 may be included inside the battery case 2. In this case, as depicted in FIG. 4, it is preferable that each heat absorbing layer 1 be interposed between the unit cells 3. This is because the heat absorbing layer 1 can absorb the heat of an individual unit cell that generates heat extraordinarily. In FIG. 4, a layered direction of the cathode collector 11, the cathode layer 12, the solid electrolyte layer 13, the anode layer 14 and the anode collector 15 in the unit cell 3 either may be same as or may cross a layered direction of the heat absorbing layer 1 and the unit cell 3. Especially, as depicted in FIG. 5, for example, it is preferable that the layered direction of the cathode collector 11, the cathode layer 12, the solid electrolyte layer 13, the anode layer 14 and the anode collector 15 in the unit cell 3 match the layered direction of the unit cell 3 and the heat absorbing layer 1. In this case, the above described "shutdown effect" is more pronounced. In addition, in this case, it is preferable that the heat absorbing layer 1 be in contact with at least one of the cathode collector and the anode collector of the unit cell 3.

As described above, in the battery according to the disclosed embodiments, at least one kind of an organic heat absorbing material selected from sugar alcohols and hydrocarbons, and an inorganic hydrate, are included in the heat absorbing layer to make it possible to increase compactness of the heat absorbing layer. Compared with the cases where the heat absorbing layer is composed only of an organic heat absorbing material and where the heat absorbing layer is composed only of an inorganic hydrate, an endotherm of the heat absorbing layer per volume unit can be increased largely and synergistically.

EXAMPLES

1. Making Heat Absorbing Sheet

A heat absorbing layer was formed on a cathode collector with the flow depicted in FIGS. 6A to 6D. First, an organic heat absorbing material, an inorganic hydrate and solvent (heptane) containing binder (acrylate-butadiene rubber, ABR) were prepared (FIG. 6A), they were mixed, and solids were dispersed in the solvent with an ultrasonic homogenizer to be slurry (FIG. 6B). The obtained slurry was applied over aluminum foil (FIG. 6C) to be dried, and after that, pressure (4t) was applied with CIP (FIG. 6D) to form the heat absorbing layer on the cathode collector. The amount of the binder in the heat absorbing layer was 1.6 mass %.

Examples 1 to 4 and Comparative Examples 1 and 2

Mannitol was employed as an organic heat absorbing material and calcium sulfate dihydrate was employed as an inorganic hydrate. A heat absorbing sheet according to each of Examples 1 to 4 and Comparative Examples 1 and 2 was obtained by the above described method while mass ratios of an organic heat absorbing material and an inorganic hydrate in the heat absorbing layer were modified. Table 1 below presents the mass ratios of an organic heat absorbing material and an inorganic hydrate included in the heat absorbing sheet when the total of the organic heat absorbing material and the inorganic hydrate was the basis (100 mass %) for each of Examples 1 to 4 and Comparative Examples 1 and 2.

TABLE 1

|  | Organic Heat Absorbing Material (Mass %) | Inorganic Hydrate (Mass %) |
| --- | --- | --- |
| Comparative Example 1 | 0 | 100 |
| Example 1 | 10 | 90 |
| Example 2 | 30 | 70 |
| Example 3 | 50 | 50 |
| Example 4 | 70 | 30 |
| Comparative Example 2 | 100 | 0 |

2. Evaluation of Heat Absorbing Sheet 2.1. Measurement of Compactness

Figure 7:
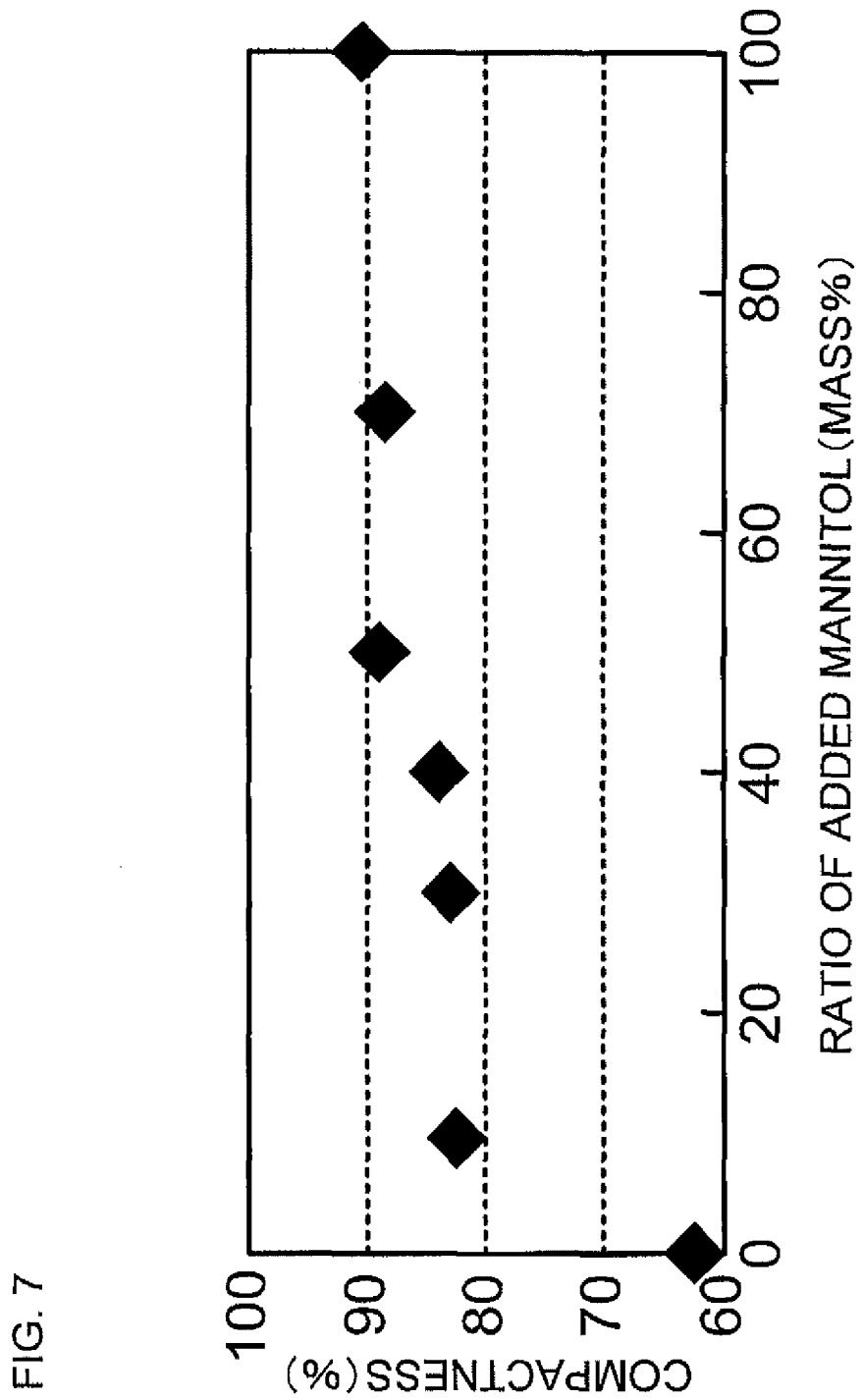
FIG. 7 depicts a result of the measurement of compactness of a heat absorbing sheet containing mannitol and calcium sulfate dihydrate.

A mass and thickness (volume) of each heat absorbing sheet were measured, to calculate the density. The calculated density was divided by the true density, to calculate compactness of the heat absorbing sheet. The result is depicted in FIG. 7. As depicted in FIG. 7, addition of mannitol to the heat absorbing sheet made compactness of the heat absorbing sheet increase. Especially, assuming that the total of calcium sulfate dihydrate and mannitol was 100 mass %, the compactness was increased to approximately 90% or more when the ratio of the added mannitol was 50 mass % or more.

2.2. Measurement of Endotherm

Figure 8:
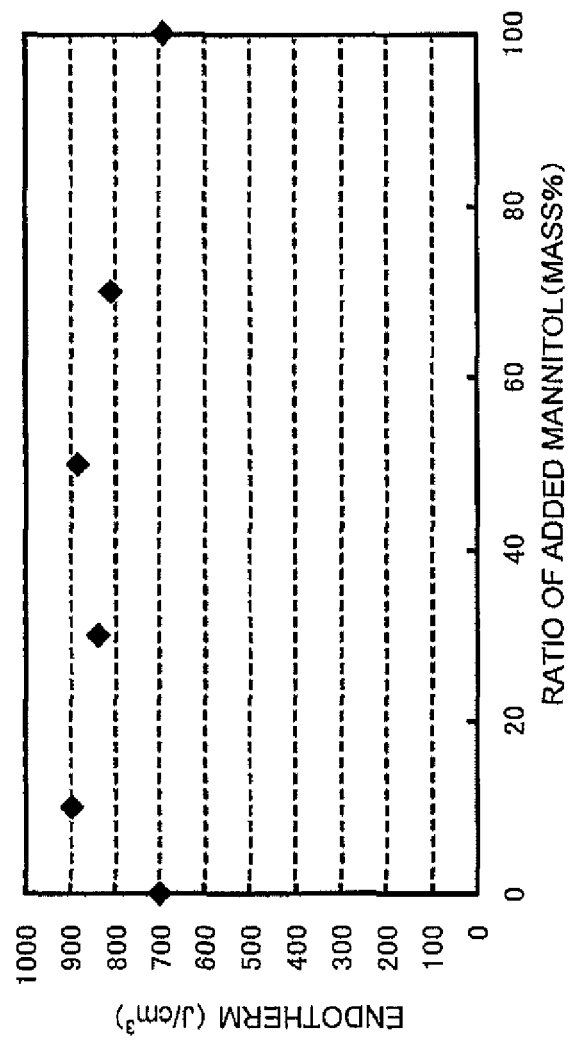
FIG. 8 depicts a result of the measurement of endotherms of the heat absorbing sheet containing mannitol and calcium sulfate dihydrate, per unit volume.

An endotherm of each heat absorbing sheet was measured with a DSC instrument (manufactured by HITACHI, DSC7000X series). A pan that was used was open. The heating rate was 10° C./min. The measurement was carried out within the temperature range of 50° C. to 500° C. under an argon atmosphere. The measurement result is depicted in FIG. 8. As depicted in FIG. 8, in the case where the heat absorbing sheet was composed of mannitol and calcium sulfate dihydrate, an endotherm of the heat absorbing sheet per unit volume increased largely compared with the cases where the heat absorbing sheet was composed only of mannitol, and where the heat absorbing sheet was composed only of calcium sulfate dihydrate. That is, the above described combination brought about the synergistic combined effect.

Figure 9:
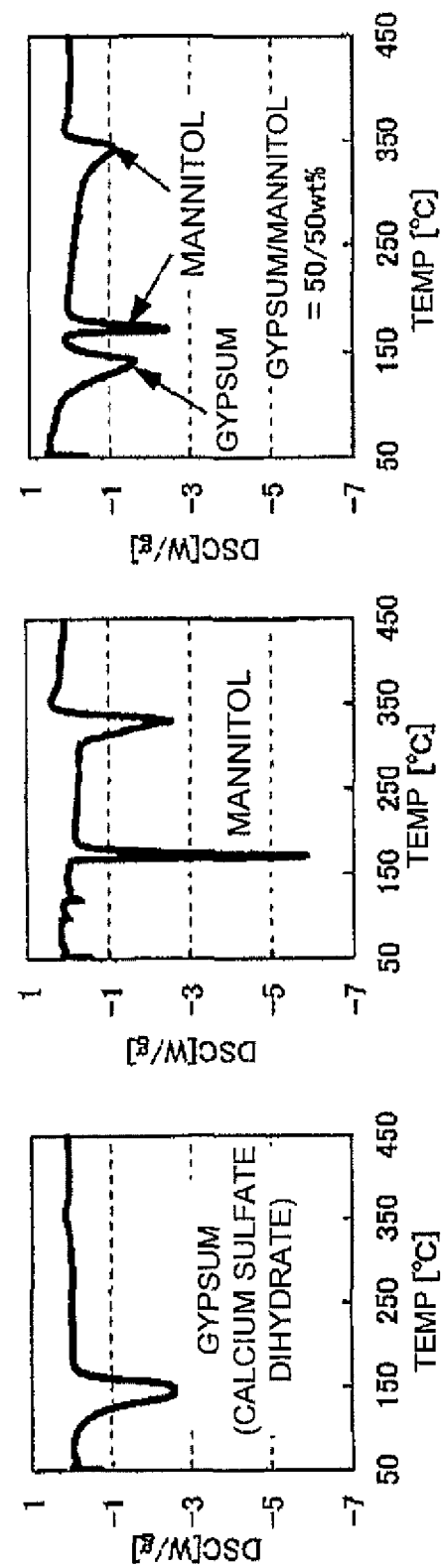
FIG. 9 depicts DSC curves of the heat absorbing sheets according to Comparative Examples 1 and 2 and Example 3.

FIG. 9 depicts DSC curves concerning Comparative Examples 1 and 2 and Example 3. As is clear from FIG. 9, endotherm peaks originating from each of mannitol and calcium sulfate dihydrate were conceived even after mannitol and calcium sulfate dihydrate were mixed. In short, it was understood that mannitol and calcium sulfate dihydrate seldom underwent chemical reaction with each other in the heat absorbing sheet.

Figure 10:
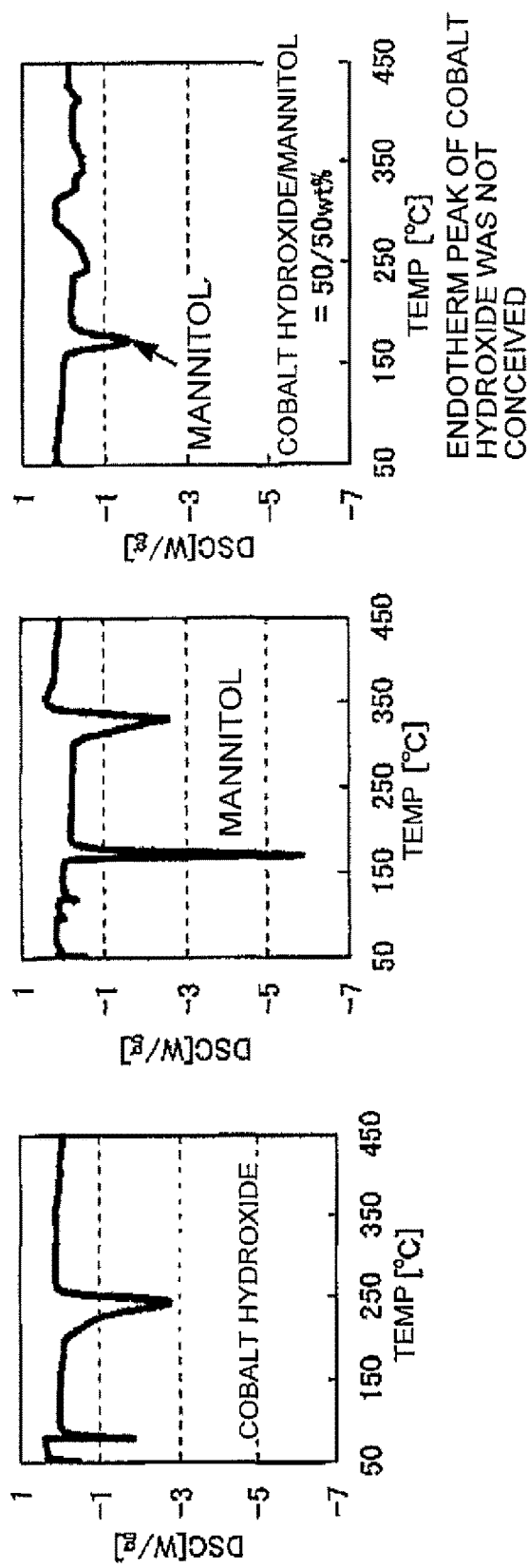
FIG. 10 depicts DSC curves of heat absorbing sheets using inorganic hydroxides.

In contrast, FIG. 10 depicts DSC curves about heat absorbing sheets composed of mannitol and an inorganic hydroxide (cobalt hydroxide) as reference data. As is clear from FIG. 10, in a case where mannitol and cobalt hydroxide were mixed, the endotherm peaks originating from cobalt hydroxide almost disappeared. That is, it was understood that mannitol and cobalt hydroxide underwent chemical reaction with each other in the heat absorbing sheet, and the endothermic performance deteriorated (and in some cases, got lost).

3. Confirmation of Shutdown Effect 3.1. Synthesis of Solid Electrolyte

According to the method described in JP 2012-48973 A, $LiI-90(0.75Li_2S-0.25P_2S_5)$, the sulfide solid electrolyte, was synthesized. The synthesized sulfide solid electrolyte was crystallized and micronized according to the method described in JP 2014-102987 A.

3.2. Making Cathode Mixture Slurry

Cathode mixture slurry was obtained by mixing 52 g of cathode active material that was obtained by $LiNi_{1/3}Co_{1/3}Mn_{1/3}O_2$ (manufactured by Nichia Corporation, the average particle size ($D_{50}$)=5 μm) coated with $LiNbO_3$, 1 g of vapor grown carbon fiber (VGCF) (manufactured by Showa Denko K.K.), 17 g of the above described sulfide solid electrolyte and 15 g of dehydrated heptane (manufactured by Kanto Chemical Co., Inc.). Coating $LiNi_{1/3}Co_{1/3}Mn_{1/3}O_2$ with $LiNbO_3$ was carried out according to the method described in JP 2010-73539 A.

3.3. Making Anode Mixture Slurry

Anode mixture slurry was obtained by mixing 36 g of graphite (manufactured by Mitsubishi Chemical Corporation), 25 g of the above described sulfide solid electrolyte and 32 g of dehydrate heptane (manufactured by Kanto Chemical Co., Inc.).

3.4. Making Unit Cell

Aluminum foil or aluminum foil to which the heat absorbing layer was applied was prepared as the cathode collector, and copper foil was prepared as the anode collector. The above described cathode mixture slurry was applied to the cathode collector to be dried, and the above described anode mixture slurry was applied to the anode collector to be dried. Then, a cathode having the cathode layer on the surface of the cathode collector and an anode having the anode layer on the surface of the anode collector were obtained. The above described sulfide solid electrolyte (solid electrolyte layer) was arranged between the cathode layer and the anode layer, and all of them were pressed to be integrated to make the unit cell. A plurality of the unit cells were made with the same method.

3.5. Making Battery Including Heat Absorbing Layer

Each of the above described plural heat absorbing sheets was disposed so as to be interposed between the unit cells. At this time, as depicted in FIG. 5, a layered direction of the cathode collector, the cathode layer, the solid electrolyte layer, the anode layer and the anode collector in the unit cell matched a layered direction of the unit cell and the heat absorbing sheet. The unit cells between which the heat absorbing sheets were interposed were housed in a battery case (aluminum/resin-laminate pack), to obtain a battery including the heat absorbing layers.

3.6. Nail Penetration Test

Figure 11:
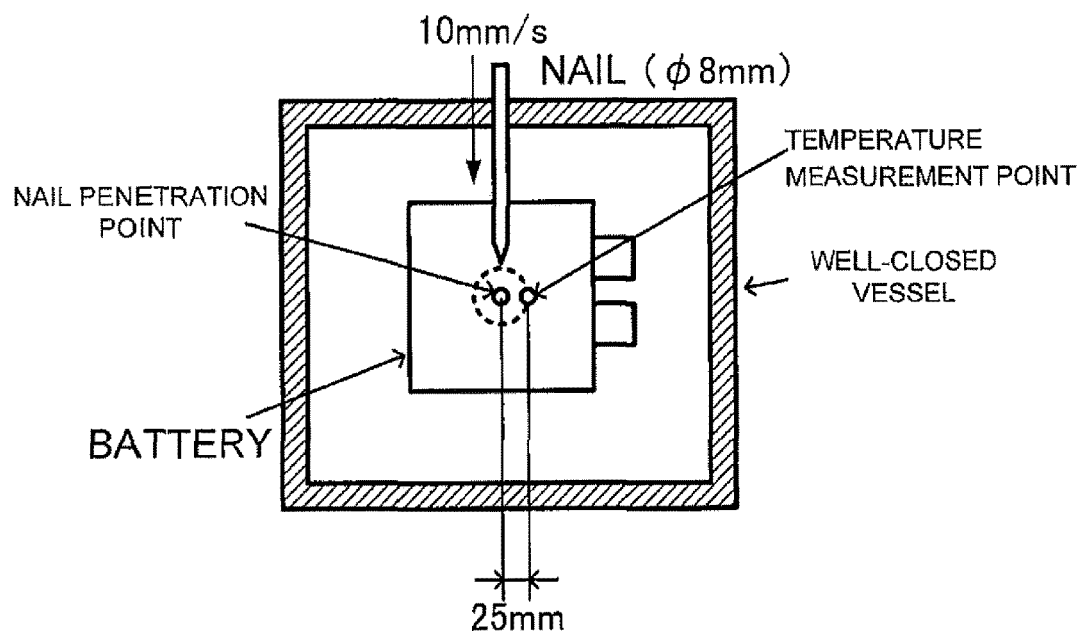
FIG. 11 is a view of conditions for a nail penetration test according to an embodiment.

A nail penetration test was carried out on the battery under the conditions depicted in FIG. 11, and time-course of voltage of the battery and the maximum achievable temperature after the nail penetration were confirmed.

Figure 12:
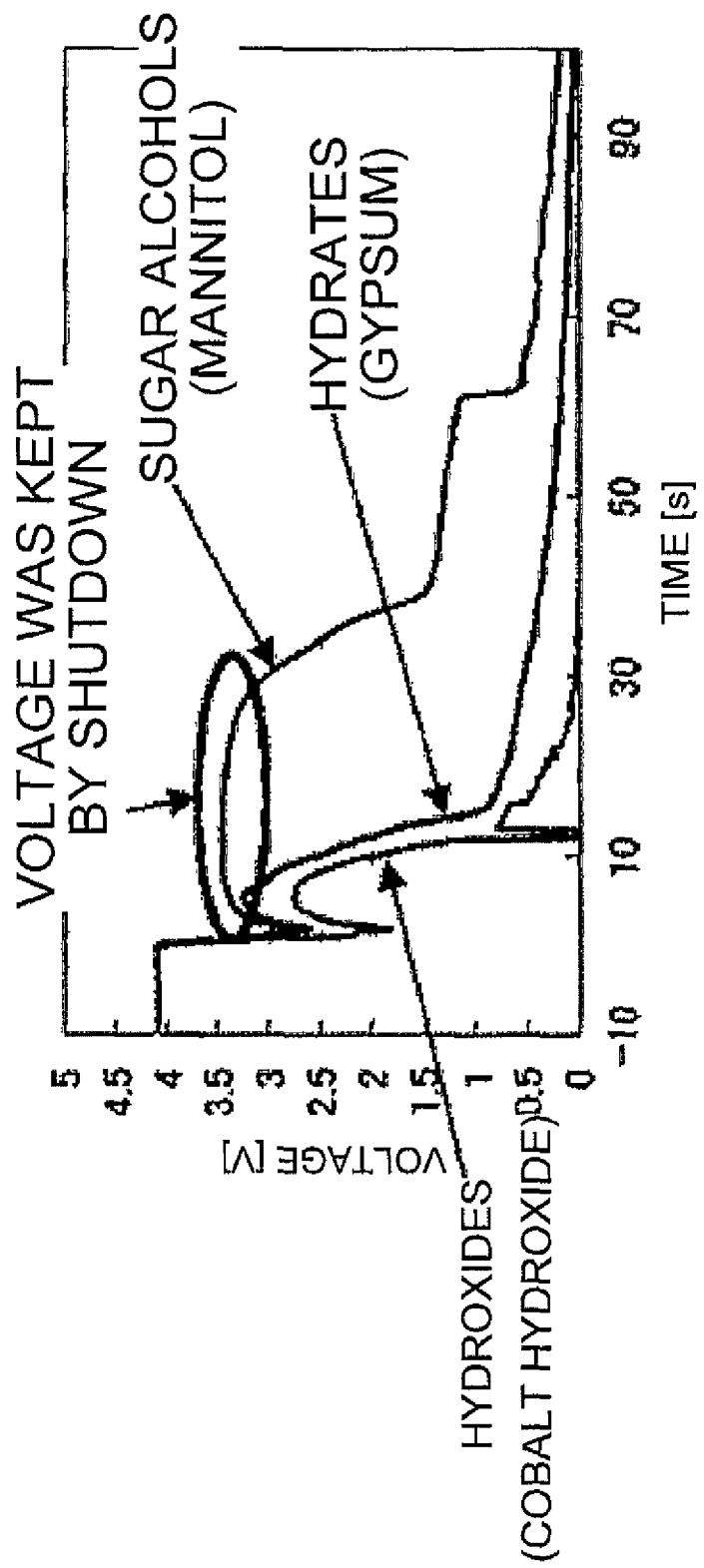
FIG. 12 depicts a result of the nail penetration tests (time-course of voltage) on batteries each including a heat absorbing sheet consisting of one kind of a heat absorbing material, confirming the shutdown effect brought about by the heat absorbing sheet that consists of mannitol.
Figure 13:
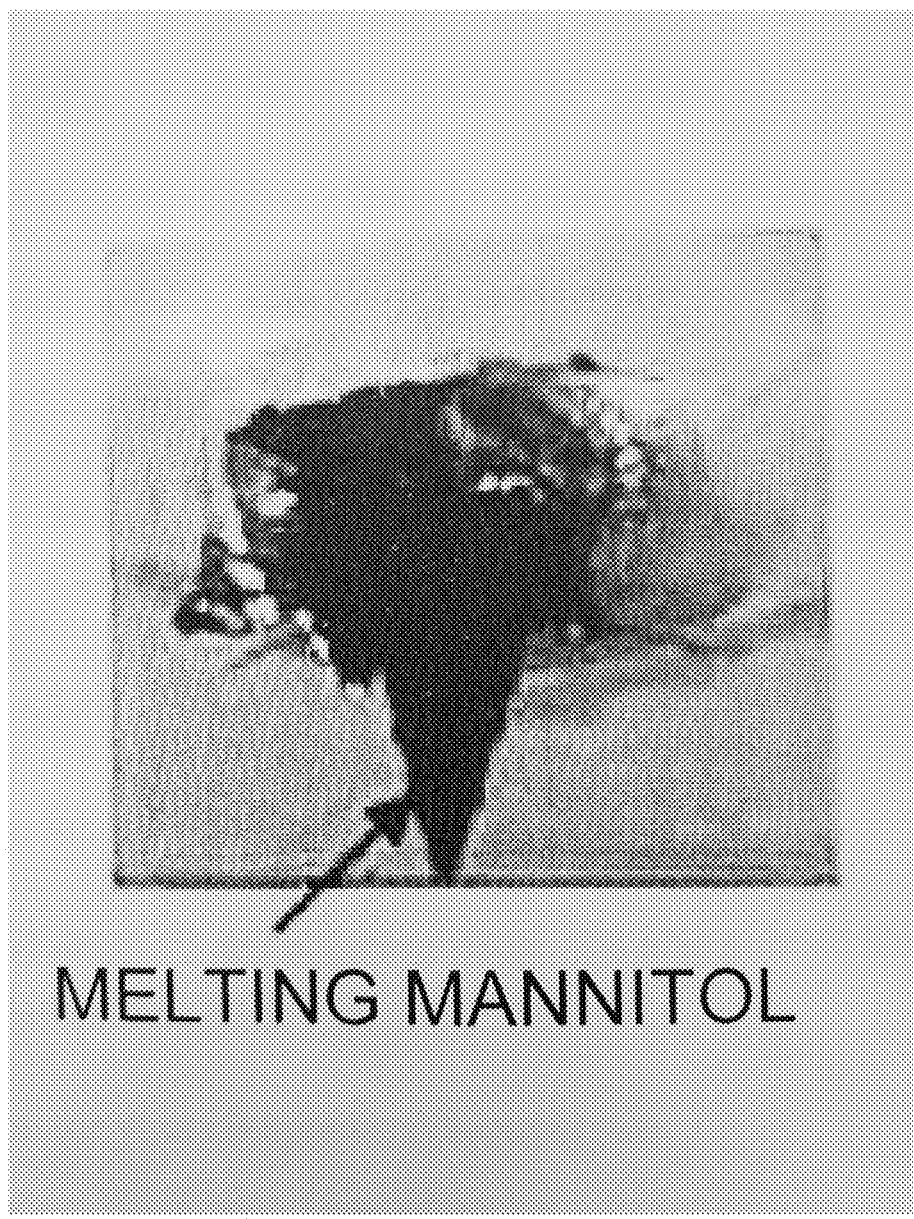
FIG. 13 depicts an appearance of mannitol that covers the circumference of a nail.

FIG. 12 depicts the result of the nail penetration tests on: (i) the battery only including heat absorbing sheets each composed of an inorganic hydroxide (cobalt hydroxide) as the heat absorbing layer; (ii) the battery only including heat absorbing sheets each composed of an inorganic hydrate (calcium sulfate dihydrate) as the heat absorbing layer; and (iii) the battery only including heat absorbing sheets each composed of an organic heat absorbing material (mannitol) as the heat absorbing layer. As is clear from FIG. 12, voltage suddenly dropped after the nail penetration in each of the battery only including heat absorbing sheets each composed of cobalt hydroxide and the battery only including heat absorbing sheets each composed of calcium sulfate dihydrate. It was understood that internal short circuits occurred due to the nail penetration. On the other hand, voltage was kept for a certain time in the battery only including heat absorbing sheets each composed of mannitol after the nail penetration, and after that, the voltage gradually dropped. A state of the surface of the nail after the nail penetration was observed, and as depicted in FIG. 13, it was found that the melting mannitol covered the circumference of the nail. As described above, it was found that the organic heat absorbing material that displayed an endothermic performance due to its melting covered the circumference of the nail when melting in the nail penetration test to make it possible to reduce a current flowing in the nail (make it possible to obtain the shutdown effect). As a result, the extraordinary heat generation in the battery itself could be suppressed.

Figure 14:
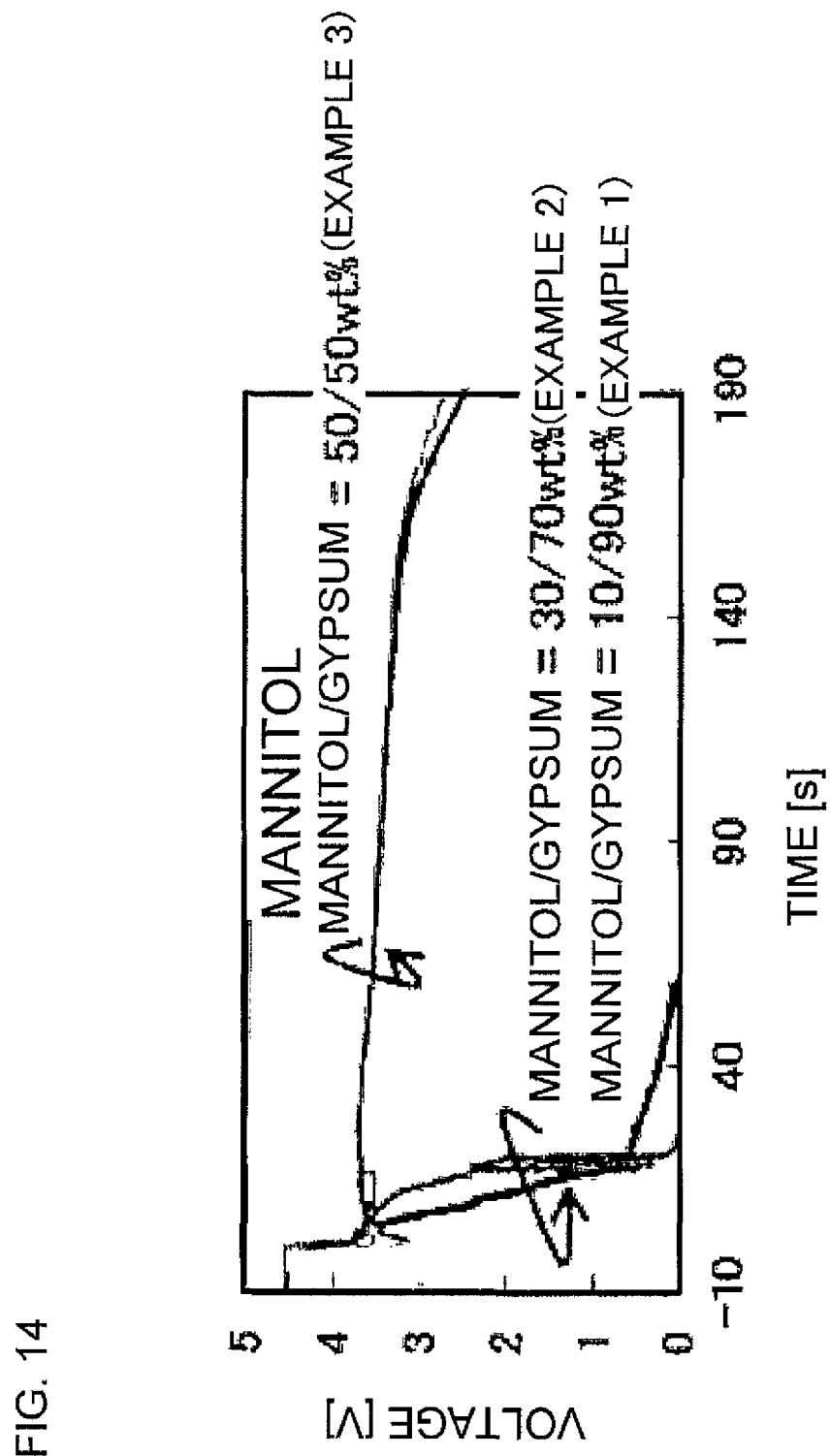
FIG. 14 depicts a result of the nail penetration tests (time-course of voltage) on the batteries including the heat absorbing sheets according to Examples 1 to 3, confirming the shutdown effect brought about by the heat absorbing sheet according to Example 3.

FIG. 14 depicts the result of the nail penetration test on the batteries including the heat absorbing sheets according to Examples 1 to 3. FIG. 14 depicts time-course of voltage of the batteries after the nail penetration. As is clear from FIG. 14, it was found that in a case where the heat absorbing sheet included no less than 50 mass % of mannitol assuming that the total of mannitol and calcium sulfate dihydrate was the basis (100 mass %), the desired shutdown effect was obtained. In Examples 1, 2, and 3, the heat absorbing sheet included 8.4 mg/cm$^2$, 9.2 mg/cm$^2$, and 11.2 mg/cm$^2$ of mannitol, respectively. In view of the above, it was found that in a case where the heat absorbing sheet included no less than 10 mg/cm$^2$ of mannitol, the desired shutdown effect could be obtained. The desired shutdown effect made it possible to suppress a heat generation value to the half or less.

The following were found from the above results.

Figure 16:
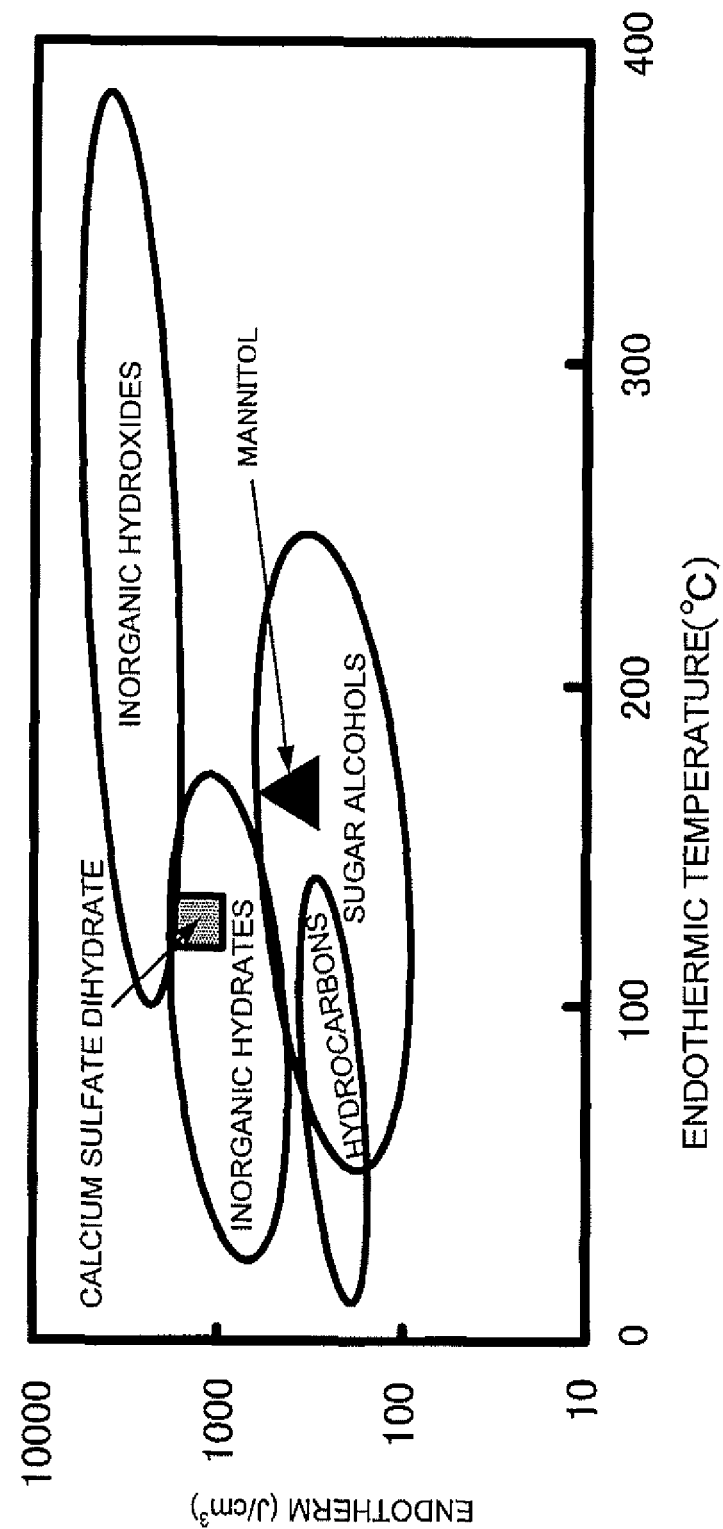
FIG. 16 depicts the relationship between endothermic temperature and theoretical endotherm of various materials.

First, calcium sulfate dihydrate had high hardness, and when used for a heat absorbing layer, voids were generated to make the compactness deteriorate, and an endotherm of the heat absorbing layer per unit volume decreased largely (approximately 700 J/cm$^3$) compared to the theoretical endotherm (approximately 1300 J/cm$^3$) (see FIG. 16).

Second, including mannitol in the heat absorbing layer as a material of low hardness made it possible to increase compactness of the heat absorbing layer. For example, the compactness increased to approximately no less than 90% when mannitol was no less than 50 mass % to the total of calcium sulfate dihydrate and mannitol.

Third, cobalt hydroxide chemically reacted with mannitol. Thus, a desired endotherm was not obtained if they were combined to be the heat absorbing layer.

Fourth, in the case where the heat absorbing layer was composed of mannitol and calcium sulfate dihydrate, an endotherm of the heat absorbing layer per unit volume increased largely compared with the cases where the heat absorbing layer was composed only of mannitol and where the heat absorbing layer was composed only of calcium sulfate dihydrate. That is, the above combination displayed the synergistic combined effect.

Fifth, increasing the proportion of mannitol included in the heat absorbing layer (for example, making the proportion of mannitol no less than 50 mass % to the total of calcium sulfate dihydrate and mannitol) allowed melting mannitol to adhere to the circumference of the nail in the nail penetration test. In this case, an amount of current flowing into the nail in the nail penetration could be reduced, and as a result, an effect of holding down extraordinary heat generation of the battery could be obtained. Such an effect could not be obtained from calcium sulfate dihydrate or cobalt hydroxide, which vaporized to absorb heat.

In the above experiments, it is illustrated that mannitol was used as an organic heat absorbing material, and calcium sulfate dihydrate was used as an inorganic hydrate to compose the heat absorbing sheet. However, the disclosed embodiments are not limited to this composition.

4. Organic Heat Absorbing Materials Other than Mannitol

Figure 15:
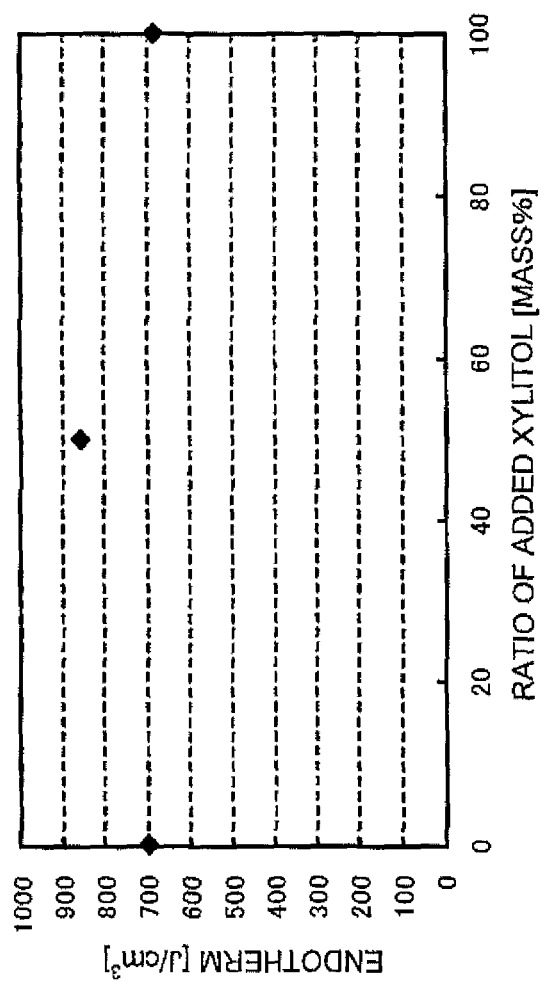
FIG. 15 depicts a result of the measurement of endotherms of the heat absorbing sheet containing xylitol and calcium sulfate dihydrate, per unit volume.

Xylitol was used as an organic heat absorbing material instead of mannitol, the heat absorbing sheet was made with the above described procedures, and its endotherm was measured. The result is depicted in FIG. 15. As is clear from FIG. 15, an endotherm per unit volume could increase synergistically even in a case where xylitol and calcium sulfate dihydrate were included in the heat absorbing layer. That is, it was found that any sugar alcohol could be preferably used as an organic heat absorbing material included in the heat absorbing layer.

In contrast from the above experimental results, it can be said that, if satisfying the following requirements, an organic heat absorbing material included in the heat absorbing layer can display the same effects as those of sugar alcohols:

(I) a material absorbing heat due to its melting:

(II) a material softer than inorganic hydrates and able to undergo plastic deformation when shaped; and (III) a material difficult to react with inorganic hydrates.

Heat absorbing materials of hydrocarbons can be listed as materials that satisfy all these requirements, other than sugar alcohols. FIG. 16 summarizes theoretical endotherms of sugar alcohols, hydrocarbons, inorganic hydrates and inorganic hydroxides. As depicted in FIG. 16, hydrocarbons have a theoretical endotherm almost the same as that of sugar alcohols while their endothermic temperatures range lower than those of sugar alcohols. In addition, it is assumed that chemical reactivity of hydrocarbons is low and hydrocarbons seldom react with inorganic hydrates since hydrocarbons are apparently softer than inorganic hydrates and do not have any functional groups.

As depicted in FIG. 16, inorganic hydroxides have an extremely large theoretical endotherm. However, as is clear from the above experimental results, there is a risk that inorganic hydroxides chemically react with sugar alcohols, and thus inorganic hydroxides are not preferable as materials included in the heat absorbing layer. Meanwhile, there is a possibility that chemical reaction of an organic heat absorbing material and an inorganic hydroxide can be suppressed in a case where a hydrocarbon that has lower reactivity than sugar alcohols is used as the organic heat absorbing material. In view of this, an inorganic hydroxide can be added to the heat absorbing layer in addition to an organic heat absorbing material and inorganic hydrate as long as the beneficial effect of the disclosed embodiments is not impaired.

4.2. Inorganic Hydrates Other than Calcium Sulfate Dihydrate

Figure 17:
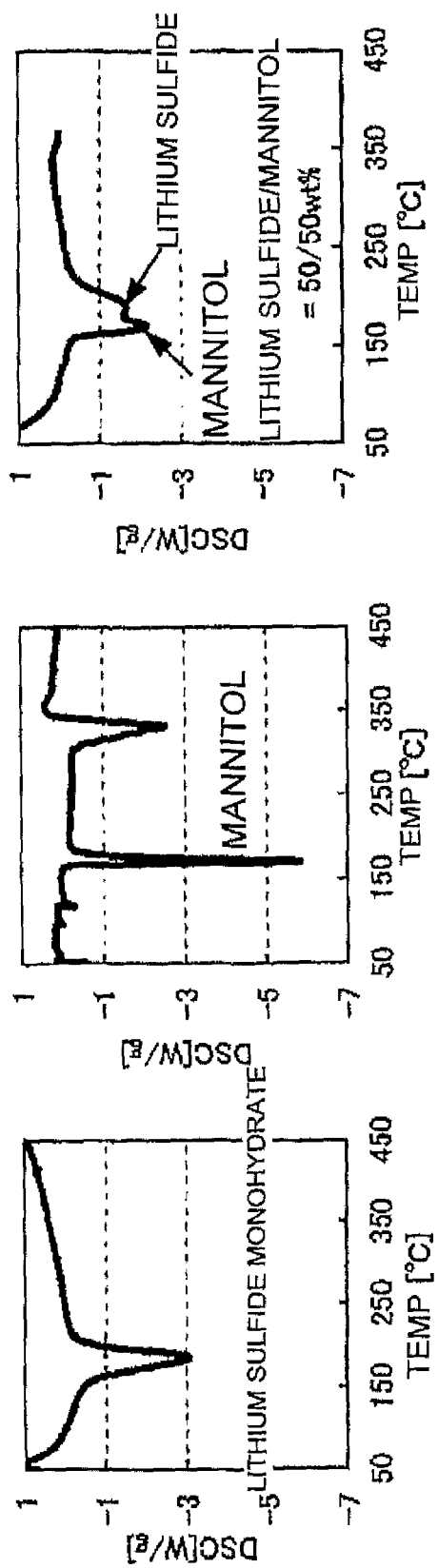
FIG. 17 depicts DSC curves of the heat absorbing sheets using lithium sulfate monohydrate and mannitol.

Lithium sulfate monohydrate was used as an inorganic hydrate instead of calcium sulfate dihydrate, and endotherm was measured with a DSC like the above. As depicted in FIG. 17, endotherm peaks originating from each of mannitol and lithium sulfate monohydrate were confirmed even after mannitol and lithium sulfate monohydrate were mixed. In short, it was understood that mannitol and lithium sulfate monohydrate did not undergo chemical reaction with each other in the heat absorbing sheet. From this, it was assumed that the desired combined effect was also brought about by lithium sulfate monohydrate.

As described above, superiority of the heat absorbing layer including a sugar alcohol and/or a hydrocarbon and an inorganic hydrate is demonstrated. That is, a battery comprising: a heat absorbing layer, wherein the heat absorbing layer includes an inorganic hydrate and at least one kind of an organic heat absorbing material selected from sugar alcohols and hydrocarbons according to the disclosed embodiments makes it possible to provide a battery including a heat absorbing layer of a large endotherm per unit volume.

INDUSTRIAL APPLICABILITY

The battery according to the disclosed embodiments can be used, for example, as an on-board power source for vehicles.

What is claimed is:

1. A battery comprising at least one heat absorbing layer, the at least one heat absorbing layer comprising calcium sulfate dehydrate and mannitol.

2. The battery according to claim 1, wherein an endotherm of the mannitol is in the range of 90° C. to 200° C.

3. The battery according to claim 1, wherein an amount of the mannitol in the at least one heat absorbing layer is no less than 50%, by mass %, of a total amount of the mannitol and calcium sulfate dehydrate.

4. The battery according to claim 1, wherein an amount of the mannitol in the at least one heat absorbing layer is no less than 10 mg/cm$^2$.

5. The battery according to claim 1, further comprising a battery case configured to include the at least one heat absorbing layer and at least one unit cell inside the battery case.

6. The battery according to claim 5, wherein the at least one unit cell is an all-solid-state battery, and
    the at least one heat absorbing layer and the at least one unit cell are in contact with each other.

7. The battery according to claim 6, wherein the all-solid-state battery includes a cathode collector, a cathode layer, a solid electrolyte layer, an anode layer and an anode collector in sequential order in a thickness direction of the battery, and
    the at least one heat absorbing layer is provided on at least one of a surface of the cathode collector disposed on a side opposite to the cathode layer and a surface of the anode collector disposed on a side opposite to the anode layer.

8. The battery according to claim 6, wherein a plurality of heat absorbing layers and unit cells are included inside the battery case, and
    each of the heat absorbing layers is interposed between respective unit cells.

9. The battery according to claim 1, wherein the at least one heat absorbing layer further comprises a binder.

10. The battery according to claim 1, wherein the at least one heat absorbing layer has a sheet shape.

11. The battery according to claim 1, wherein a thickness of the at least one heat absorbing layer is in the range of 5 µm to 500 µm.

12. The battery according to claim 1, wherein a compactness of the at least one heat absorbing layer is no less than 80%.

13. The battery according to claim 1, wherein a compactness of the at least one heat absorbing layer is no less than 90%.

* * * * *